Fig. 2.

June 8, 1954  S. J. GEDRIS  2,680,270
AUTOMATIC FOUNDRY MOLDING MACHINE
Filed Dec. 26, 1952  6 Sheets-Sheet 3

Inventor
Stanley James Gedris
By
Attorney

June 8, 1954  S. J. GEDRIS  2,680,270
AUTOMATIC FOUNDRY MOLDING MACHINE
Filed Dec. 26, 1952  6 Sheets-Sheet 4

Inventor
Stanley James Gedris
By
Attorney

June 8, 1954  S. J. GEDRIS  2,680,270
AUTOMATIC FOUNDRY MOLDING MACHINE
Filed Dec. 26, 1952  6 Sheets-Sheet 5

Inventor
Stanley James Gedris
By Peter P. Price
Attorney

Patented June 8, 1954

2,680,270

UNITED STATES PATENT OFFICE 2,680,270

AUTOMATIC FOUNDRY MOLDING MACHINE

Stanley James Gedris, Grand Rapids, Mich.

Application December 26, 1952, Serial No. 328,050

3 Claims. (Cl. 22—20)

This application relates to foundry equipment, and more particularly to an entirely automatic machine capable of making an entire mold without the intervention of an operator and to the process cycle of making a mold which I have developed, the carrying out of which may be accomplished by my machine.

This application is related to my application entitled "Molding Machine," Serial No. 723,025, filed January 20, 1947, now abandoned.

Although the art of casting metals is ancient, antedating most civilizations still existent, it still today remains a largely manual industry. Although the forming of metals other than by casting has become, to a very large extent, an automatic procedure carried out by large, complex and highly accurate machines, the making of molds for castings remains a hand operation. Many simple and complex machines have been developed for use in the making of molds. These machines, however, have not been automatic. They are merely mechanical adjutants to a primarily manual operation. The number of manual operations and their particular relationship one to the other remains much the same as it was more than a century ago. No one of these prior developments attempts to reduce the making of a complete mold to an integrated cycle consisting of a comparatively small number of precisely timed and coordinated steps. These previous developments have not only not attempted to reduce the making of a complete mold to a timed and coordinated cycle but they have not attempted to divide this cycle into subcycles whereby the various steps involved in making a mold may be carried out simultaneously to reduce the production time necessary to produce a given number of molds.

None of the previous inventions provides a machine capable of taking a pair of empty flasks at one end of the machine and of turning out a complete mold ready for pouring of the molten metal at the other end without the intervention of an operator. All of the previous machines at some point utilize an operator to carry out at least one, usually a large number, of the steps necessary to make the completed mold. It is recognized that in the making of a mold there are many variables which must be overcome. It is because of these variables that the intervention of an operator has always been believed to be essential. My machine provides a mechanism capable of making a mold either despite these variables or by eliminating these variables, thus making the presence of the operators entirely unnecessary.

It is, therefore, a primary object of my invention to provide a new cyclic process for making a complete mold which consists of at least two subcycles which may be carried out substantially simultaneously.

It is a further object of my invention to provide a fully automatic mold making machine capable of making a completed mold ready for casting without the intervention of an operator.

It is an additional object of my invention to provide a fully automatic molding machine which is relatively simple to construct and which may be entirely confined within a relatively small area.

It is a further additional object of my invention to provide a fully automatic mold making machine which is adapted for operating under the conditions of abrasion and corrosion normally found in the conventional foundry.

These and other objects of my invention will be immediately seen by those acquanted with the design, construction and use of foundry equipment upon reading the following specification and the accompanying drawings.

In executing the objects and purposes of my invention, I have provided a molding machine consisting of a pair of parallel conveyors each terminating in a third conveyor positioned perpendicularly to these conveyors. Within each one of the pair of conveyors I have provided a mold making station. One of these mold making stations is designed to make the drag mold and the other is designed to make the cope mold. The operation of the stations is coordinated whereby each step carried out at one mold making station is simultaneously carried out at the other mold making station. Thus, when a single mold making cycle is completed at one mold making station, it is also completed at the other mold making station. The molds completed in these mold making stations are moved onto the third conveyor where the drag mold is inverted and mated with a cope mold to form a complete mold ready for pouring.

Figure 2:
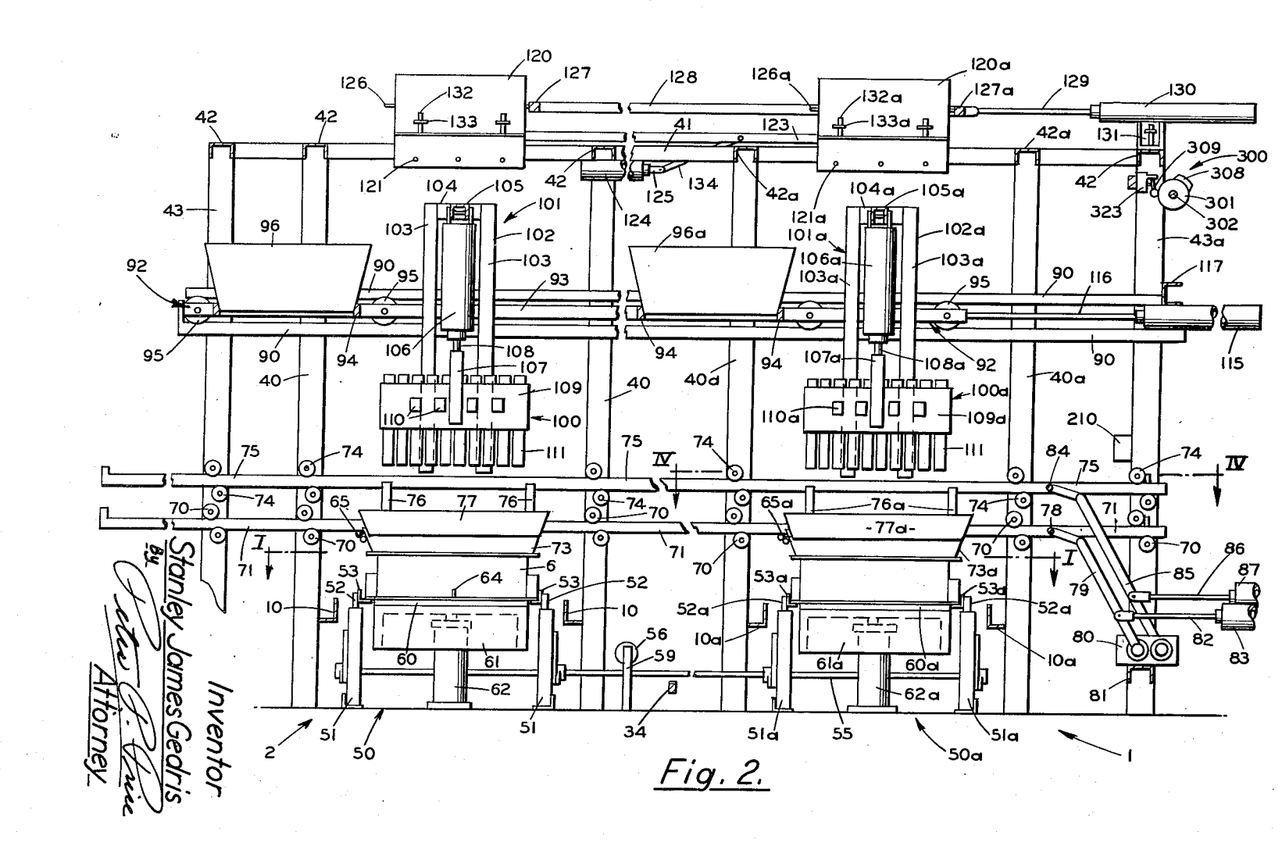
Figure 2 is a broken, sectional, elevation view of my automatic molding machine taken along the plane II—II of Figure 1.

In the following description the terms "upwardly" and "downwardly" are freely used and are to be taken as "upwardly" as the machine is normally used and as shown in Fig. 2 and "downwardly" away therefrom. The terms "forwardly" and "rearwardly" are frequently used in relation to the conveyors supplying flasks to both the cope mold making station and the drag mold making station. As so used, the term "forwardly" is to be taken as meaning in the direction in which the empty flasks move along these conveyors through the mold making stations and onto the third conveyor where the flasks with a mold formed within them are joined together to form a completed mold, and the term "rearwardly" away therefrom. The terms "upstream" and "downstream" are also freely used in describing the conveyor between the mold making stations. As so used the term "downstream" is to be taken as meaning in a direction away from the drag mold making station and toward the cope mold making station and "upstream" away therefrom.

Referring now to the drawings in greater detail, the numeral 1 indicates a drag mold making station operatively connected to a cope mold making station 2 by a step by step conveyor 3. Flasks 4 are supplied to the drag mold making station 1 by a step by step conveyor 5. Flasks 6 are supplied to the cope mold making station 2 by a step by step conveyor 7. The flasks 4 and 6 are identical in size and shape. Each of the flasks 4 and 6 is equipped with an outwardly extending ear 8 on each side at its rearward end, as the flasks are seated on the conveyors 5 and 7. The upper end of each of the ears 8 is spaced a substantial distance from the upper rim of the flask as the flask is situated on these conveyors.

Cope and drag flask conveyors

The conveyors 5 and 7 are identical in construction and operation. Therefore, I shall describe the conveyor 7 for the cope flasks, it being understood that this description applies equally to the conveyor 5 for the drag flasks. The numbers for like parts on each conveyor will be identical except that the numbers appearing on the drag flask conveyor 5 will be suffixed by the letter *a*.

The conveyor 7 includes a pair of spaced rails 10 (Fig. 1) constituting an outer track 11 and a pair of spaced rails 12 constituting an inner track 13 centered between and above the rails 10. Mounted on the outer track 11 by means of the wheels 15 is the carriage 16. The carriage 16 consists of a pair of side members 17 held together by the U-shaped braces 18 and are spaced apart sufficiently to receive a flask 6 therebetween. At the forward end of the carriage are a pair of lugs 19. The lugs 19 are each directed toward each other whereby they will contact the ears 8 on the flask 4. A pair of clips 20 are pivotally mounted to the side members 17 of the carriage 16 adjacent its rearward end. Each of these clips 20 is urged toward the flask 6 by a spring 21. Pivotal movement of each of the clips 20 toward the flask 4 is limited by a peg 22 cooperating with a cutout in the rearward end of the clip. Each of the clips 20 is provided with a slot 23 adjacent its forward end for receiving one of the ears 8.

Figures 3, 4:
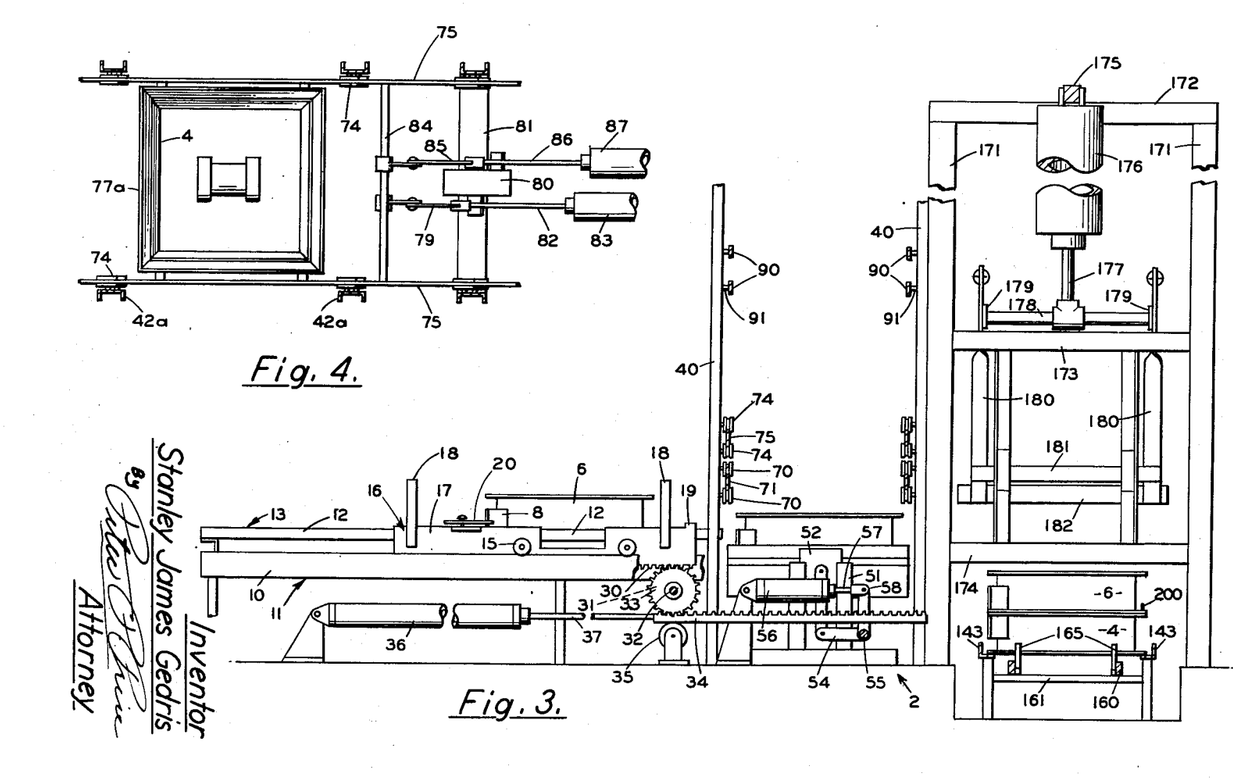
Figure 3 is a sectional, side elevation view of the cope mold making portion of my automatic molding machine taken along the plane III—III of Figure 1.
Figure 4 is a fragmentary, plan, sectional view taken along the plane IV—IV of Figure 2.

The lower edge of each of the side members 17 of the carriage 16 is formed into teeth 30 for engaging a gear 31 mounted on the shaft 32 (Fig. 3). One gear 31 is provided for each of the side members 17. The shaft 32 extends between and under both the cope flask conveyor 7 and the drag flask conveyor 5. Between these conveyors a gear 33 is mounted on the shaft 32 for engaging the rack 34. The rack 34 is supported by the roller 35 (Fig. 3) and actuated by means of the cylinder 36 and piston 37. Reciprocation of the piston 37 causes simultaneous, opposite reciprocation of the carriages on both the cope flask conveyor 7 and the drag flask conveyor 5.

Cope and drag mold making stations

The cope mold making station 2 and the drag mold making station 1 are identical in construction and operation. These mold making stations have identical parts except those parts which are common to both mold making stations. Therefore, I shall describe the cope mold making station 2, it being understood that the structure described is duplicated at the drag mold making station 1, except where the parts are stated to be common to both mold making stations. The numbers for like parts at each mold making station, but which parts are not common to both mold making stations, will be identical except that the numbers appearing on the drag mold making station 1 will be suffixed by the letter *a*.

Surrounding the mold making station are four vertical standards 40 (Fig. 1) having longitudinal capping beams 41 (Fig. 2) and lateral capping beams 42. The longitudinal capping beams 41 extend between the cope mold making station 2 and the drag mold making station 1 and are common to both stations. A pair of outlying vertical standards 43 (Fig. 2) are provided for supporting the ends of the longitudinal capping beams 41.

Figure 6:
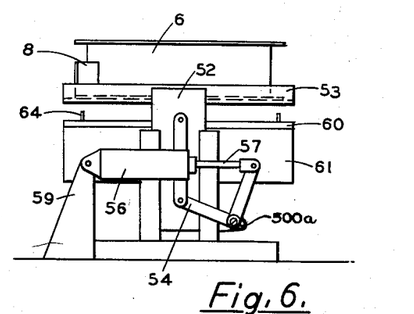
Figure 6 is a side elevation view of the lower portion of the cope mold making station showing the flask in raised position.

The lower part of the cope mold making station 2 consists of a pedestal 50 including a pair of spaced, vertical guides 51. Slidably mounted in each of the guides 51 is a slide 52, each of which supports a rail section 53. The rail sections 53 are spaced apart the same distance as the rails 12 of the inner track 13. The slides 52 are each attached to one end of a toggle unit 54. The other end of each of the toggle units is attached to a shaft 55 rotatably journaled in the ears 500a secured to the fixed guides 51 and 51a. The shaft 55 is common to both of the molding stations, whereby rotation of the shaft in one direction will cause the toggle units 54 to open, raising the slides 52 and rail sections 53 (Fig. 6). Rotation of the shaft 55 in the other direction will close the toggle units 54, lowering the slides 52 and rails 53 (Fig. 3). Thus, the raising and lowering of the rails 53 in both the cope mold making station 2 and the drag mold making station 1 is effected simultaneously. The rotation of the shaft is effected by the cylinder 56 and piston 57 acting through the link 58 secured on one of its ends to the shaft 55 and on the other of its ends to the piston 57. The cylinder 56 is pivotally supported by the standard 59. A single cylinder 56 rotates the shaft 55.

Figure 5:
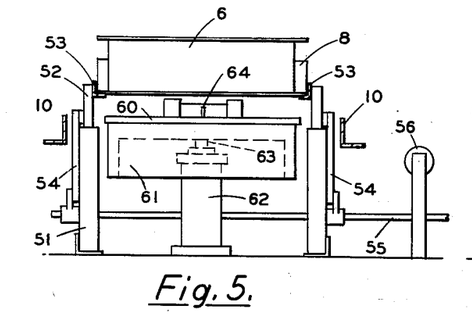
Figure 5 is a sectional, elevation view taken along the plane II—II of Figure 1 but showing only the cope mold making station and showing the flask in raised position.

Between the rails 53 is a pattern plate 60 seated on the platform 61. The platform 61 is supported by the vertical cylinder 62 acting through the piston 63 (Fig. 5). The flasks 6 are positioned on the pattern plate 60 by a pair of guide pins 64 (Fig. 5) mounted on the pattern plate 60. The guide pins 64 enter suitable holes in the flasks 6. The purpose and operation of the cylinder 62 will be explained under "Operation."

Figure 7:
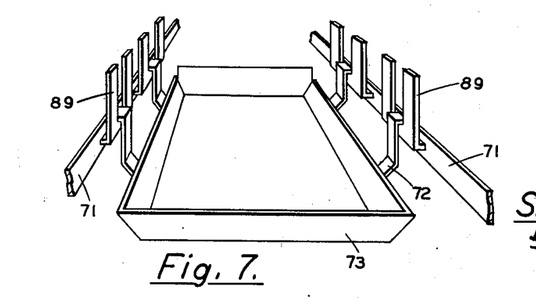
Figure 7 is an oblique view of the secondary strike off for my automatic molding machine.

Above the cope molding station 2 and the drag molding station 1 a pair of guide wheels 70 (Figs. 2 and 3) are mounted on each of the vertical standards 40, 40a, and the outlying vertical standards 43 and 43a. The guide wheels 70 of each pair are vertically spaced apart to receive a beam 71 therebetween. One of the beams 71 is mounted at the forward end and one at the rearward end of the mold making station. The beams 71 are common to both the cope mold making station 2 and the drag mold making station 1. Mounted on and between the beams 71 by means of the hooks 72 loosely seated in the U-shaped yokes 69 are a pair of secondary strike off frames 73 and 73a (Fig. 7). The combinations of the hooks 72 and yokes 69 permit the strike off to move vertically relative to the beams 71 but permit no horizontal displacement. The secondary strike off frames 73 and 73a are spaced apart the same distance as the spacing between the mold making stations.

Figure 15:
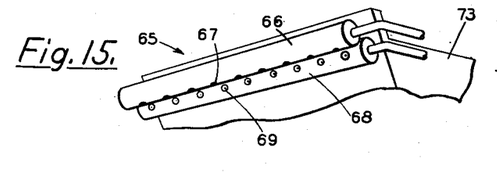
Figure 15 is a fragmentary oblique view of the liquid parting applying mechanism for my automatic molding machine.

Above and spaced from the guide wheels 70 are additional pairs of guide wheels 74. The disposition, spacing and number of the guide wheels 74 is identical to that of the guide wheels 70. Mounted between the guide wheels 74, on both the forward and rearward ends of the molding stations, is a beam 75. The beams 75 are identical and parallel to the beams 71 and by means of the hangers 76 support a pair of primary strike offs 77 and 77a spaced apart the same distance as the spacing between the mold making stations. At the leading edge of the secondary strike offs 73 and 73a (Figs. 2 and 15) there is mounted a liquid parting sprayer 65 and 65a, respectively. The liquid parting sprayer consists of an air pipe 66 having a plurality of vertically directed orifices 67. Below and adjacent the air pipe 66 is a liquid parting pipe 68 having a plurality of horizontally directed nozzles 69. The nozzles 69 are each vertically aligned with one of the orifices 67. The flow of air through the air pipe 66 is controlled by the valve 240. The construction and operation of the liquid parting sprayers is disclosed in my copending application entitled "Means for Applying Liquid Parting," Serial No. 142,257, filed March 3, 1950, now abandoned.

The beams 71 are, at their ends adjacent the drag mold making station 1, connected by the rod 78 which, in turn, is pivotally mounted to one end of the hinged arm 79. The other end of the hinged arm 79 is pivotally mounted to the stationary plate 80 supported on the beam member 81 extending between the outlying vertical standards 43a. Adjacent the stationary plate 80, the hinged arm is connected to the piston 82 actuated by the cylinder 83.

The beams 75 are, at their ends adjacent the drag mold making station 1, connected by the rod 84, which rod is pivotally mounted to one end of the hinged arm 85. The other end of the hinged arm 85 is pivotally mounted to the stationary plate 89. Adjacent the stationary plate 89, the hinged arm 85 is connected to the piston 86 actuated by the cylinder 87. Thus, movement of the piston 82 will impart similar movement to both of the beams 71 and the secondary strike offs 73 and 73a. Likewise, movement of the piston 86 will impart similar movement to both of the beams 75 and the primary strike offs 77 and 77a.

Substantially above the beams 75 and parallel to them are tracks 90, common to both the cope mold making station 2 and the drag mold making station 1. The tracks 90 are mounted in vertically spaced pairs, one pair on the forward end and one on the rearward end of the mold making stations. The tracks 90 are each mounted to the vertical standards 40 and 40a and the outlying vertical standards 43 and 43a and are spaced therefrom by spacers 91 (Fig. 3). The cradle 92, consisting of a pair of runners 93 and cross beams 94, is mounted to the tracks 90 by means of the wheels 95. The wheels 95 travel between the tracks 90. Normally the wheels 95 bear upon the lower ones of the tracks 90 and have a slight clearance with the upper of the tracks 90.

On the cradle 92 is mounted a pair of sand guides 96 and 96a. Each of the sand guides 96 and 96a is seated between a pair of cross beams 94. The sand guides 96 and 96a each have the shape of a frustum of a pyramid with the sides converging in a downwardly direction. The sand guides 96 and 96a are spaced apart the same distance as the spacing between the mold making stations.

Adjacent each of the sand guides 96 and 96a is a tamper head 100 and 100a, respectively. The tamper heads 100 and 100a are each supported by a frame 101 and 101a, respectively, mounted on the carriage 92. The frames 101 and 101a are identical. Therefore, I shall describe the frame 101 for the tamper head 100 at the cope mold making station 2 only. It will be remembered, however, that the identical parts are duplicated at the drag mold making station 1 and will be indicated by the same numerals, except those parts appearing at the drag mold making station will be suffixed by the letter a.

The frame 101 consists of a pair of U-shaped supports 102 each mounted to one of the runners 93 of the cradle 92. Each of the U-shaped supports 102 includes a pair of vertical, parallel way bars 103 free at their lower ends and joined at their upper ends by the end bar 104. The way bars 103, substantially midway between their free ends and the end bar 104, are each rigidly attached to one of the runners 93. Between the end bars 104 of the pair of U-shaped supports 102 extends a terminal bar 105 from the midpoint of which depends the cylinder 106. The tamper head 100 is suspended, by means of the yoke 107, from the piston 108 of the cylinder 106. The yoke 107 is attached to the peripheral frame 109 of the tamper head 100. On each side of the yoke 107 is a pair of slide blocks 110. A pair of slide blocks 110 is provided for each of the way bars 103, which way bars are slidably received between the slide blocks 110. Thus, four pairs of slide blocks 110 are provided on each of the tamper heads.

The tamper heads 100 and 100a are spaced apart the same distance as the spacing between the cope mold making station 2 and the drag mold making station 1. The tamper heads 100 and 100a each consist of a peripheral frame 109 containing a plurality of heavy, vertical weights or bars 111 each free for vertical reciprocating movement with respect to the frame 109. The exact construction of the tamper head is not further detailed because the details of its design form no part of this invention and are fully disclosed in my Patent No. 2,325,501.

The spacing between the sand guides 96 and 96a and the tamper heads 100 and 100a, respectively, is such that when the sand guides 96 and 96a, are vertically aligned with the pattern plates 60 and 60a, respectively, the tamper heads 100 and 100a are entirely removed from above these pattern plates. The purpose and importance of this construction will appear more fully hereinafter. The alignment and removal of the sand hoppers 96 and 96a and the tamper heads 100 and 100a is effected by reciprocation of the cradle 92. The cradle 92 is reciprocated by the cylinder 115 through the piston 116. The cylinder is mounted on the lateral beam 117.

Figure 9:
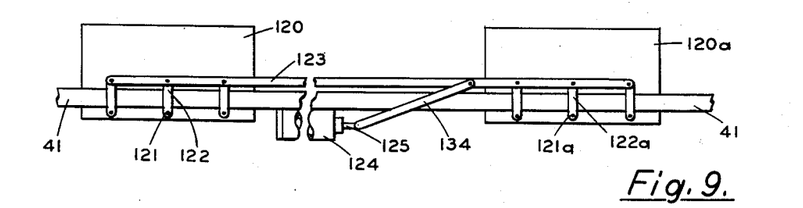
Figure 9 is a broken, fragmentary, side elevation view of my sand hoppers showing the means for releasing the sand from the sand hoppers but not showing any of the structure for measuring the sand in the hoppers.

Vertically aligned with each of the pattern plates 60 and 60a is a sand hopper 120 and 120a, respectively. The sand hoppers 120 and 120a are stationary and rigidly mounted to the longitudinal capping beams 41. Each of the sand hoppers is equipped with lower vanes, each vane mounted on one of the rotatable shafts 121. The rotatable shafts 121 are each provided with an arm 122 on one end (Fig. 9), which arms are each joined to the link 123. The link is reciprocated by the cylinder 124 and piston 125 through the tie bar 134. The cylinder 124 is mounted to the lower face of one of the lateral capping beams 42.

Figure 8:
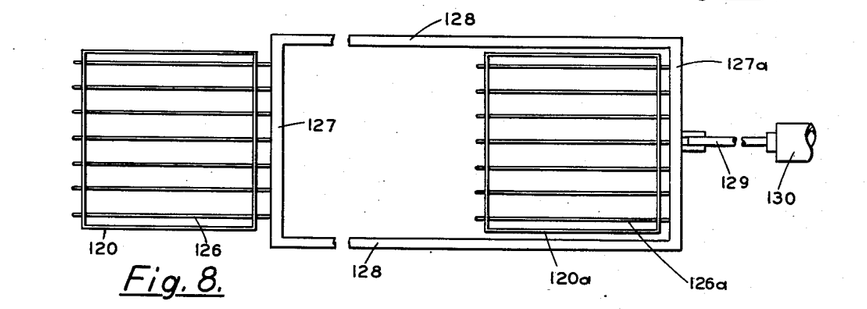
Figure 8 is a broken plan view of the sand hoppers for my automatic molding machine showing the means for measuring the sand in the hoppers.

Spaced substantially above the vanes are a plurality of closely spaced rods 126 (Figs. 2 and 8) extending through the hopper longitudinally of my molding machine. The rods 126 are joined together by the head piece 127. The head pieces 127 and 127a are joined for simultaneous operation by the tie rods 128. The piston 129 of the cylinder 130 is attached to the head piece 127a. The cylinder 130 is mounted on the vertically adjustable pedestal 131. The sides of the sand hoppers 120 and 120a are each formed of two telescoping sections, the upper section of which is vertically adjustable with respect to the lower section by means of the slots 132 and wing nuts 133.

Further and more detailed description of the sand hoppers is not considered to be necessary inasmuch as they may be constructed in several ways without affecting the principle of my invention. A description of a preferred construction for my sand hoppers is to be found in my application entitled "Molding Machine," Serial No. 732,047, filed March 3, 1947, now Patent 2,542,243 issued February 20, 1951.

*Drag flask inverter*

Figures 10, 13:
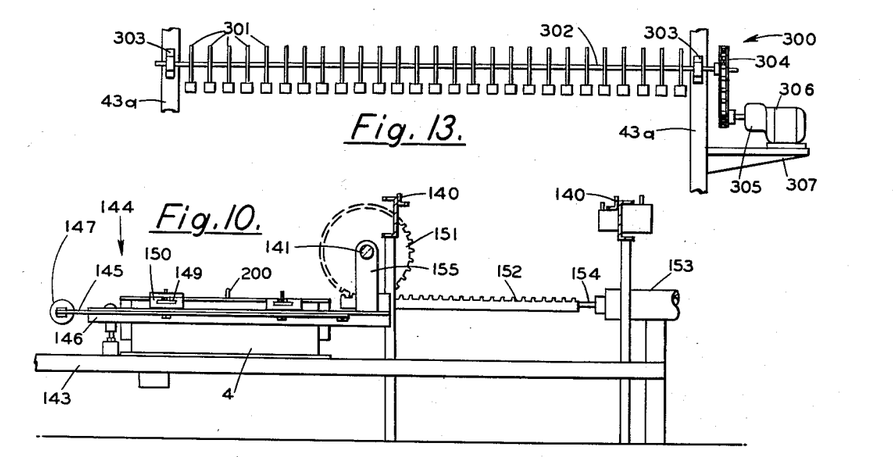
Figure 10 is a fragmentary side elevation view of the turnover frame for my automatic molding machine.
Figure 13 is a somewhat schematic representation of the control mechanism for coordinating the various operations of my automatic molding machine.
Figure 11:
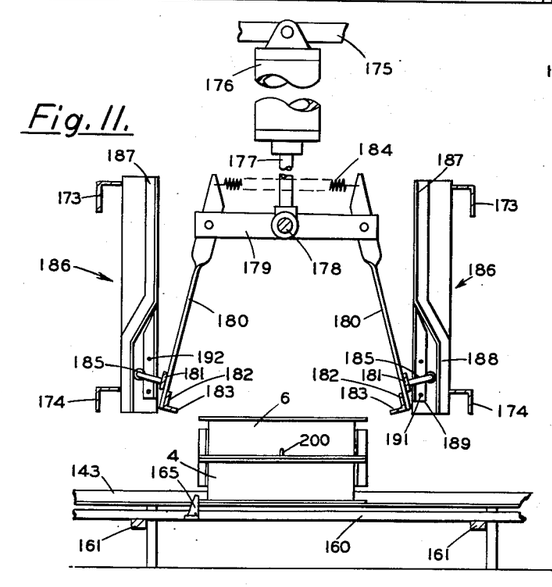
Figure 11 is a fragmentary, end elevation view of the cope flask hoist for my automatic molding machine.
Figure 12:
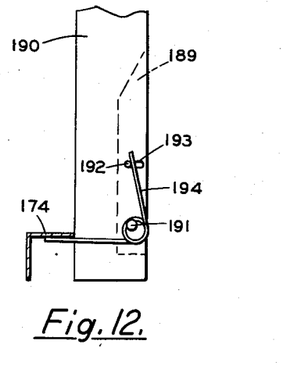
Figure 12 is an enlarged fragmentary view of the switch track for my cope flask hoist mechanism.
Figure 14:
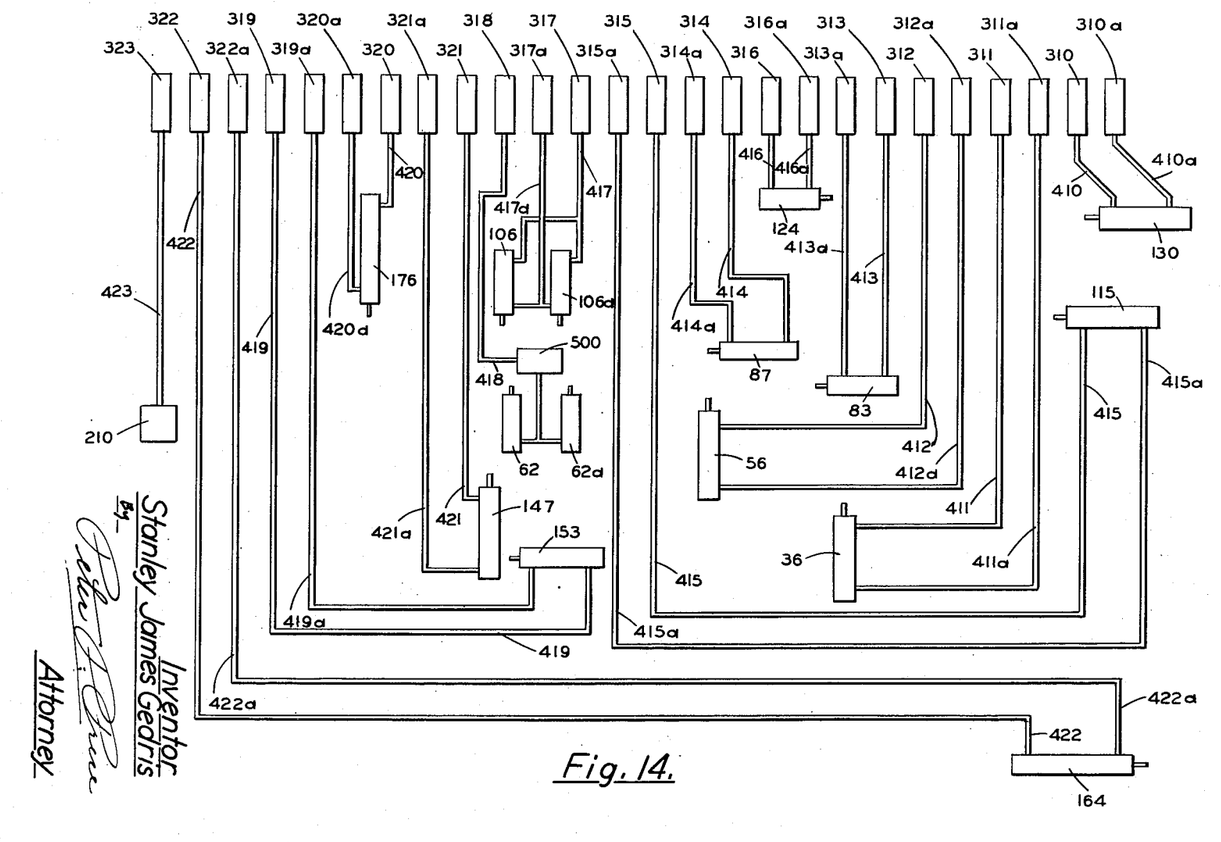
Figure 14 is a diagrammatic sketch of the valves and cylinders for controlling and actuating the various parts of my automatic molding machine.

At the forward end of the rail sections 53a of the drag mold making station 1 and overlying the conveyor 3 are a pair of stationary rails 140. The rails 140 are spaced apart the same distance as the rail sections 53a and are at the same elevation as the rails 12a and the rail sections 53a when the latter are in their raised position. On the downstream side of the rails 140 is a shaft 141 rotatably journaled to the conveyor side beams 142. Below the shaft 141 and between the side beams 142 are the spaced tracks 143 for conveying the drag flasks 4 to a position adjacent the cope mold making station 2. To the shaft 141 by means of the hanger straps 155 is attached the turnover frame 144. The turnover frame 144 (Figs. 1 and 10) includes a pair of spaced arms 145 each pivotally mounted at one of its ends to one of the sides 146 of the turnover frame adjacent the shaft 141. The arms 145 are joined together at their ends remote from the shaft 141 by the cylinder 147 and piston 148. Each of the arms 145 pivotally mounts a pair of fingers 149, which fingers are adapted to grip the rim of a drag flask 4. The fingers are guided by the guide blocks 150. The shaft 141 is rotated by means of the gear 151 which meshes with the rack 152. The rack is actuated by the cylinder 153 and piston 154.

The length of the hanger straps 155 is such that when the turnover frame 144 is pivoted to a position above and parallel to the rails 140, the fingers 149 may grip the bottom rim of a drag flask 4, and, when the drag flask 4 has been pivoted to a position at which it seats upon the spaced tracks 143, the fingers 149 are spaced from the tracks 143 the height of the drag flask 4. The shaft 141 is rotated 180° and in so doing transfers the drag flask 4 from the rails 140 to the tracks 143 and inverts the flask. A description of a preferred construction for my flask inverter is to be found in my application entitled "Flask Turnover for Foundry Molding Machine," Serial No. 176,508, filed July 28, 1950, now Patent 2,627,335 issued February 3, 1953.

*Conveyor between mold making stations*

The conveyor 3 consists of the spaced tracks 143. Beneath and between the spaced tracks 143 are a pair of reciprocating rods 160 slidably mounted on the laterals 161. The rods 160 are joined, adjacent the drag mold making station 1, by the bar 162. The bar 162 is operatively attached to the piston 163 of the cylinder 164. The rods 160 mount pivoted dogs 165. The dogs 165 are mounted in pairs, each pair of which will engage the upstream end of a flask and move it downstream of the conveyor with the rod 160. The dogs 165 are spaced along the rods 160 in such a manner that a first pair of them will engage a flask deposited by the turnover frame 144 and push the flask downstream to a point where on the next actuation of the rods 160 that flask will be pushed by a second pair of dogs to a position ready to receive the cope flask 6. Additional units of such spacing may be added between the drag mold making station 1 and the cope mold making station 2 when desired. The spacing between the drag mold making station 1 and the cope mold making station 2 is always in even multiples of the unit of downstream movement of the rods 160. This is essential in order to align successively each of the drag flasks 4 at the cope flask hoist 170 ready to receive a mating cope flask 6.

Cope flask hoist

Figure 1:
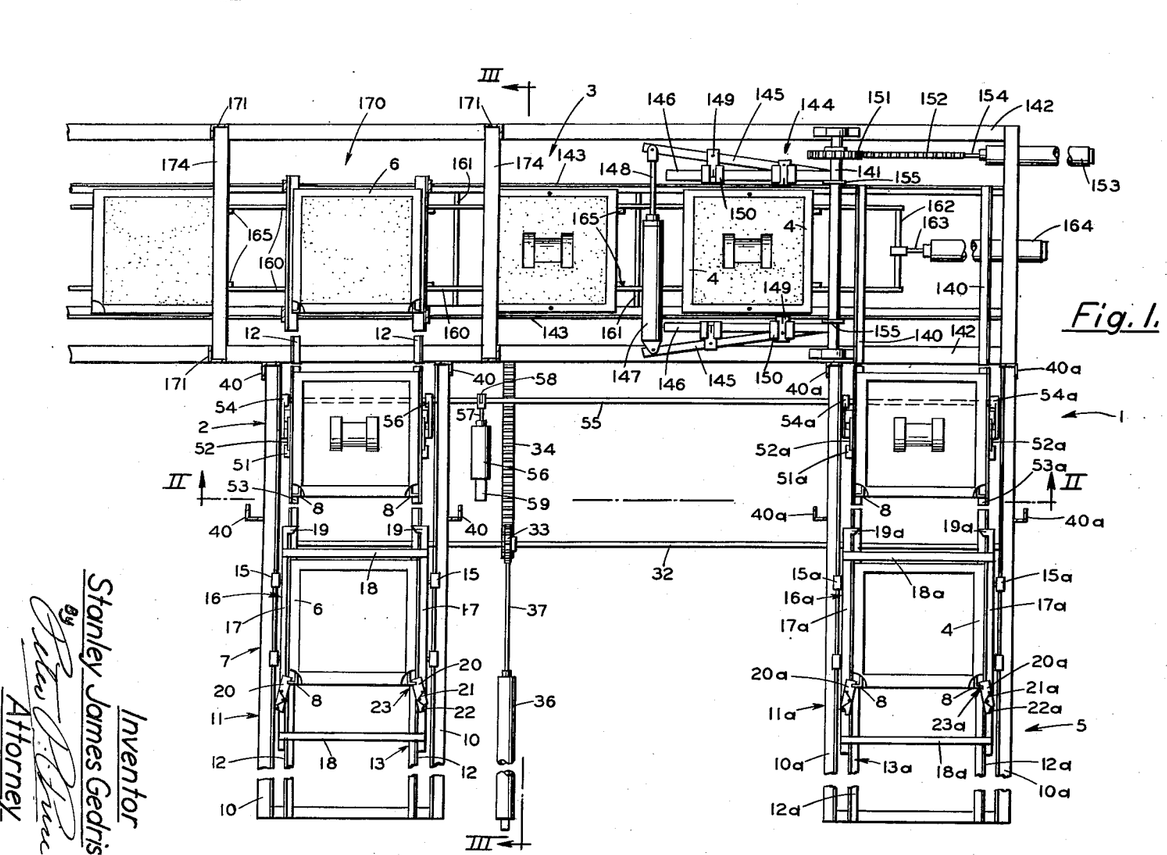
Figure 1 is a sectional plan view of my automatic molding machine taken along the plane I—I of Figure 2.

The cope flask elevator or hoist 170 is situated above the conveyor 3 in alignment with the cope mold making station 2 and at the rearward end of the conveyor 7. The supporting frame for the flask elevator or hoist 170 includes the vertical standards 171 positioned on each side of the conveyor 3 (Fig. 1). The vertical standards are joined by the top beams 172, intermediate beams 173 and lower beams 174, each extending laterally of the conveyor 3. The top beams 172 mount the cap beam 175 from which depends the cylinder 176 for actuating the piston 177. Mounted on the piston 177 is the rod 178 extending laterally of the conveyor 3. On each end of the rod 178 is a terminal bar 179, centered about the rod 178. At each end of the terminal bar an arm 180 is pivotally mounted adjacent the upper end of the arms. Thus, there is a pair of arms 180 on each side of the rod 178. The arms constituting each pair are joined by a brace 181 and an L-shaped angle 182. Each of the angles 182 has a substantially horizontal leg 183, which legs are directed toward each other.

The arms 180 project a short distance above the terminal bars 179. The pair of arms 180 mounted on each of the terminal bars 179 are joined by a spring 184 whereby the lower end of each pair of arms are forced apart. The rod 178, terminal bars 179, arms 180, braces 181 and angles 182 together form the reciprocating clasp assembly of the hoist.

Mounted on and extending outwardly from each of the braces 181 are a pair of guide rollers 185. Each of the guide rollers 185 bears against one of the guides 186. Each of the guides consists of a main track 187 having a lower portion 188 offset outwardly away from the arms 180. A switch track 189 is pivotally mounted inwardly of the lower portion 188 and is normally vertically aligned with the upper portion of the main track. Each main track 187 and switch track 189 is mounted on a beam 190. The mounting for the switch track 189 includes a pivot pin 191 and a peg 192 extending through the slot 193 in the beam 190. A spring 194, bearing against the peg 192, urges the switch track 189 into alignment with the upper portion of the main track 187. The lower end of the lower portion 188 of the main track depends substantially below the switch track 189.

More detailed description of my flask hoist is not believed necessary to a proper understanding of my mold making machine. A description of a preferred embodiment of my cope flask hoist is to be found in my application entitled "Flask Hoist for Foundry Molding Machine," Serial No. 176,507, now Patent 2,615,558 issued October 28, 1952.

The various actuating cylinders utilized for driving the various operative elements of my automatic mold making machine constitute collectively a power means. This collective term is used inasmuch as it is to be understood that these cylinders together are but one form of mechanical power by which my automatic mold making machine may be driven or operated.

Operation

The operation of my automatic molding machine constitutes a complete, integrated and fully automatic cycle during which a complete mold ready for pouring is formed without the intervention of an operator. Once the operation of the machine is initiated, it is unnecessary for any operator to intervene either during a complete mold making cycle or between each cycle.

It is recognized that auxiliary equipment will be necessary to supply my automatic molding machine with the necessary flasks and sand to maintain its operation. Among such equipment will be a source of sand and sand conveyors to supply the sand hoppers 120 and 120a. It will also be necessary to have a sand conditioner to prepare the sand for my mold making machine. However, all of this equipment may be of standard construction and is well-known to the foundry art. Also necessary will be conveyors for returning the drag and cope flasks from the shake out stations to the conveyors 5 and 7. These conveyors may also be of conventional construction. Since all of this equipment is of standard construction and may be assembled in any one of a number of suitable arrangements, it is not believed necessary to show or describe it. One such arrangement of this auxiliary equipment is described in my application entitled "Molding Machine," Serial No. 723,025, filed January 20, 1947, now abandoned.

A drag flask 4 and a cope flask 6 are simultaneously deposited on the drag flask conveyor 5 and cope flask conveyor 7, respectively. Each of these flasks is so arranged on the conveyor that the lugs 8 are at the rearward end of the flasks. By means of the cylinder 36 the carriages 16 and 16a are moved rearwardly. During this rearward movement the clips 20 and 20a engage the lugs 8. The cylinder 36 is then actuated in the opposite direction moving the carriages 16 and 16a forwardly, pushing the flasks 6 and 4 with them on the inner tracks 13 and 13a, respectively. The forward limit of travel of the carriages 16 and 16a is such that when these carriages halt their forward movement, the flasks 6 and 4 are each positioned on the rail sections 53 and 53a, respectively, with the flasks positioned ready to be lowered and seated on the pattern plates 60 and 60a. The cope flask is aligned by the guide pins 64. The drag flask is aligned by the guide pins 200 mounted on the drag flask and entering cooperating holes in the pattern plate 60a. While the carriages 16 and 16a are at the forward limit of their travel, another flask 6 and another flask 4 are deposited on the conveyors 5 and 7, respectively.

The carriages 16 and 16a each dwell at the forward limit of their travel while the cylinder 56 is actuated to simultaneously lower the rail sections 53 and 53a. This lowering of the rail sections 53 and 53a seats the flasks 6 and 4 on the pattern plates 60 and 60a, respectively. The flasks 6 and 4 are guided into exact register with the pattern plates by the guide pins 64 and 200 and, by means of these guide pins, are thereafter held against horizontal displacement. The lowering of the flasks disengages the ears 8 from the clips 20 and 20a. After the flasks have been lowered, the cylinder 36 is actuated to move the carriage rearwardly to engage the flasks which were deposited on the conveyors 5 and 7 while the carriages were in their forward position.

During the interval while the flasks 6 and 4 are being deposited on the rail sections 53 and 53a, respectively, the primary strike offs 77 and 77a and the secondary strike offs 73 and 73a are each withdrawn to a position to the side of the molding stations 1 and 2. The cradle 92 is so positioned that the tamper heads 100 and 100a are positioned to the side of the molding stations 2 and 1, respectively, and the sand guides 96 and 96a are positioned in vertical alignment between the pattern plates 60 and 60a and sand hoppers 120 and 120a, respectively.

After the carriages 16 and 16a have been withdrawn to their rearward positions, the primary strike offs 77 and 77a and the secondary strike offs 73 and 73a are simultaneously moved to a position above and vertically aligned with the flasks 6 and 4, respectively. The secondary strike offs 73 and 73a rest upon their respective associated flasks. While the secondary strike offs 73 and 73a are moving across the pattern plates 60 and 60a, the valve 210 is opened to admit air under pressure to the air pipe 66. The air escapes through the orifices 67 and draws liquid parting from the nozzles 69. These air streams atomize the liquid parting and direct it vertically against the pattern plates 60 and 60a. The supply of air is terminated when the secondary strike offs 73 and 73a reach the limit of their travel and are positioned over the flasks 6 and 4.

Either while the flasks 6 and 4 are being placed on their respective pattern plates or before, the cylinder 130 is actuated to simultaneously withdraw the rods 126 and 126a from the sand hoppers 120 and 120a. This permits sand placed in the top of the sand hoppers to pass down into the chamber in the sand hoppers between the vanes mounted on the rotatable shafts 121 and 121a and the rods 126 and 126a. The cylinder 130 is then actuated in the opposite direction to force the rods 126 and 126a back through the hoppers 120 and 120a. This entraps a measured quantity of sand between the vanes and the rods 126 and 126a. The actuation of the cylinder 130 is slow so that the inward and outward movement of the rods 126 and 126a is gradual whereby the sand will be caused to cascade into the lower chamber of the sand hopper rather than drop as a lump. This helps to condition the sand immediately prior to its deposit into the flask as is more fully explained in my application entitled "Molding Machine," Serial No. 723,025, filed January 20, 1947, now abandoned.

As soon as the primary strike offs 77 and 77a and the secondary strike offs 73 and 73a have been positioned above and aligned with the flasks 6 and 4, the cylinder 124 is actuated to rotate the rotatable shafts 121 and 121a whereby the vanes are moved downwardly into a vertical position, and the sand entrapped in the chamber above the vanes is released as a mass. This sand falls through the sand guides 96 and 96a and is deposited, as a mass, in the flasks 6 and 4. The sand hoppers 120 and 120a are spaced a very substantial distance above the flasks 6 and 4 whereby the mass of sand, as it strikes the pattern plates 60 and 60a, has an opportunity to develop appreciable momentum. This momentum causes the sand to pack tightly as it is initially deposited. Also, by means of the vanes, the sand is caused to be released from all parts of the sand hoppers 120 and 120a whereby the mass of the sand is relatively evenly distributed throughout the area of each of the flasks 6 and 4. As soon as the sand has been released from the sand hoppers 120 and 120a, the cylinder 124 is actuated in the opposite direction to close the vanes ready for the release of more sand into the chambers above these vanes.

As soon as the sand has been dropped, the cylinder 87 is actuated to withdraw the primary strike offs 77 and 77a from above the flasks. This levels the sand at the top of the secondary strike offs 73 and 73a. At the same time the cylinder 115 is actuated to remove the sand guides 96 and 96a from above the flasks 6 and 4, respectively, and to align the tamper heads 100 and 100a with these flasks. The cylinders 106 and 106a are then actuated to lower the tamper heads 100 and 100a until the bars or weights 111 rest entirely upon the sand which has been deposited in the flasks. The cylinders 62 and 62a are actuated in a fashion such that they have a series of short, rapid strokes whereby the flasks 6 and 4 and the secondary strike offs 73 and 73a are rapidly raised and lowered. During this shaking or jolting process the sand is forced up against the individual weights of the tamper heads 100 and 100a, causing the sand to become densely compacted within the flasks around the pattern on the pattern plate. In this process the compacting results first from the jolting action provided by the cylinders 62 and 62a and secondly from the weight or inertia of the individual weights or bars 111. The cooperation between the slide blocks 110 and the way bars 103 keeps the tamper heads aligned during the jolting operation. The cooperation between the hooks 72 and the U-shaped yokes 89 permits the secondary strike offs 73 and 73a to move vertically with the flasks during the jolting operation but prevents the secondary strike offs from becoming misaligned with these flasks. When sufficient jolting has been provided to securely pack the sand into the flasks 6 and 4, the tamping heads 100 and 100a are raised by means of the cylinders 106 and 106a, and, by actuation of the cylinder 115, the tamping heads are withdrawn to the side of the molding stations and the sand guides 96 and 96a realigned with the sand hoppers and with the flasks in readiness for the next mold making cycle. At the same time the cylinder 83 is actuated to withdraw the secondary strike offs 73 and 73a. At this point the making of the molds is completed.

The cylinder 56 is now actuated to raise the rail sections 53 and 53a, stripping the flasks and their molds from the pattern plates 60 and 60a. When the flasks 6 and 4 have been raised to their upper elevated position, the carriages 16 and 16a are again moved forwardly on the conveyors 7 and 5, respectively. As these carriages move forwardly, they bring an empty flask 6 and an empty flask 4 into the molding stations 2 and 1. At the same time by means of the lugs 19 and 19a, the original flasks, containing the completed molds, are pushed forwardly out of the molding stations 2 and 1. The drag flask 4 is pushed onto the rails 149 and positioned to be received by the turnover frame 144. The cope flask 6 is pushed into the cope flask hoist 170. While this operation is being carried out, the clasping element is in its raised position whereby the horizontal legs 183 of the angles 182 are positioned above the rails 12 whereby they will seat immediately under the upper rim of the cope flask and support the cope flask as it passes off the ends of the rails 12.

The turnover frame 144 is next pivoted to a position over the rails 140 at which point it seats down around the drag flask 4. The cylinder 147 is then actuated to draw the arms 145 together, forcing the fingers 149 about the lower rim of the drag flask. Actuation of the cylinder 153 then causes the shaft 141 to rotate, removing the drag flask 4 from the rails 140, inverting it and depositing it upon the spaced tracks 143 of the conveyor 3. The cylinder 147 is then actuated to eject the piston 148 separating the arms 145. This releases the drag flask. While the drag flask is being inverted, the cylinder 176 is actuated to lower the flask hoist whereby the cope flask 6 will be deposited upon a mating drag flask 4 positioned on the spaced tracks 143 immediately below the hoist. It will be understood that several drag flasks are made before making the first cope flask. This is necessary in order to have a drag flask under the cope flask hoist 170 ready to receive a cope flask. In my description I have assumed that several drag flasks have been moved, step by step, down the conveyor 3 to a position where one of them will be ready to receive the cope flask. Once my molding machine has reached this point in its operation, there will always be a drag flask positioned under the cope flask hoist 170 ready to receive a mating cope flask.

After the drag flask 4 has been deposited on the spaced tracks 143 and the fingers 149 have been caused to release this drag flask, the turnover frame remains stationary until after the next drag flask 4 has been pushed out of the drag mold making station 1 onto the rails 140. The turnover frame 144 is then pivoted to a position where it will clasp the newly positioned drag flask 4. As soon as the turnover frame 144 has cleared the drag flask initially deposited on the spaced tracks 143, the cylinder 164 is actuated to force the reciprocating rods 160 downstream of the conveyor 3. By means of the pivoted dogs 165 the drag flask 4 is moved down the conveyor one station. This movement is sufficient to remove the drag flask entirely from the operating area of the turnover frame 144. The drag flask 4 then dwells while the cylinder 164 is actuated in the opposite direction to withdraw the rods 160 to their original position ready to receive the next drag flask. The drag flask 4 positioned on the spaced tracks 143 is then positioned midway between the turnover frame 144 and the hoist 170. While in this position and while stationary any cores which should be added to the mold may be placed in the mold. During the next molding cycle of the machine and after the turnover frame 144 has placed a second drag flask 4 on the conveyor, the cylinder 164 is again actuated pushing the first drag flask 4 into position under the hoist 170. There it will remain while the rods 160 return to their initial position. While the drag flask 4 dwells beneath the hoist, the cope flask 6 is deposited upon it in the manner described above. As the cope flask 6 is deposited upon the drag flask 4, the flasks are aligned by the guide pins 200. It will be seen from this description that my machine is capable of completely automatically making a mold including both the drag mold and the cope mold and of placing these molds together ready for pouring. It is obvious that after the molds have been placed together under the hoist station 170 the next actuation of the rods 160 will push the completed mold downstream on the spaced tracks 143 where they will be ready for pouring.

Each of the actuating cylinders is so designed that the maximum length of its stroke is used in the operation of my machine. Thus, it becomes unnecessary to have special stops and releases against over travel of any of the parts.

*Operating and coordinating mechanism*

The control and timing coordination of all operations in my molding machine is effected through the control assembly 300 (Figs. 2 and 3). The means by which I coordinate the operation of each of the various elements making up my automatic mold making machine is in effect a timer, for it times the individual action of each of these elements and functionally unites these elements into a smoothly operating, unified system. Anything which is used in my automatic mold making machine which effects these same ends and is, therefore, a substitute for the cam, valve and conduit arrangement would also be a timer.

It will be recognized that my machine may be operated hydraulically, pneumatically, or electronically. However, for the sake of brevity, I shall describe the control mechanism for my machine as operated pneumatically. However, it will be understood that pneumatic operation is merely illustrative and that my invention contemplates other types of operation and coordination. It will also be understood that the particular flow diagram illustrated is only one of many different flow patterns which could be employed.

The control assembly 300 consists of a group of valves indicated by the numbers 310 through 323 and 310a through 317a and 319a through 322a. Each of these valves is individually operated by a cam 301. As many cams 301 are employed as there are valves and all of these cams are mounted on a shaft 302 rotatably supported by the journals 303. At one end of the shaft a chain and sprocket assembly 304 connects the shaft 302 to the speed reducer unit 305. The speed reducer unit 305 is driven by the electric motor 306. The motor is mounted on the platform 307 which is supported on one of the outlying vertical standards 43a.

Each of the cams 301 cooperates with a suitable arm 309 (Fig. 2) on its associated valve and, by means of the ridge 308 (Fig. 2), causes the valve to be opened for a predetermined period of time. The cams are each arranged with their ridges circumferentially located to open their particular valve in timed relationship to the operation of every other valve in such a manner that the entire machine will operate smoothly. I shall now describe the sequence of operation of the valves, it being understood that this sequence covers an entire mold making cycle and is effected by a single 360° rotation of the shaft 302. In the following description the terms "forward end of the cylinder" and "rearward end of the cylinder" are freely used and are to be taken as meaning the "forward end of the cylinder" as being that end adjacent the projecting piston rod and the "rearward end of the cylinder" as its opposite end. That is, air admitted to the "forward end of the cylinder" will retract the piston and air admitted to the "rearward end of the cylinder" will eject the piston.

In describing the cycle of operation of my machine, I have started the description considering the cycle to start at the point where the flasks 6 and 4 have been placed on the mold making stations 2 and 1, respectively, and the carriages 16 and 16a are in their rearward positions.

The valves 313, 314 and 315 are each simultaneously opened to admit air through the conduits 413, 414 and 415 to the rearward end of the cylinders 83 and 87 and to the forward end of the cylinder 115, respectively. This moves the secondary strike offs 73 and 73a and primary strike offs 77 and 77a into vertical alignment with the pattern plates 60 and 60a. It also moves the cradle 92 to a position wherein the sand guides 96 and 96a are vertically aligned with the pattern plates 60 and 60a. While the secondary strike offs 73 and 73a are being moved across the pattern plates 60 and 60a, the valve 323 is maintained in open position admitting air through the conduit 423 to the valve 210. This forces the valve 210 to open, causing the liquid parting sprayers 65 and 65a to operate. The valve 323 is closed when the secondary strike offs 73 and 73a are seated over the flasks 6 and 4.

The valve 316 is then opened to admit air through the conduit 416 to the rearward end of the cylinder 124. This opens the vanes, releasing the sand from the sand hoppers 120 and 120a into the flasks 6 and 4. The valve 314 is then closed and the valve 314a opened to admit air through the conduit 414a to the forward end of the cylinder 87. This withdraws the primary strike offs 77 and 77a. Simultaneously the valve 315 is closed and the valve 315a opened to admit air through the conduit 415a to the rearward end of the cylinder 115. This moves the cradle 92 to remove the sand guides 96 and 96a from above the flasks 6 and 4 and to position the tamper heads 100 and 100a above these flasks, respectively. At the same time the valve 316 is closed and the valve 316a is opened to admit air through the conduit 416a to the forward end of the cylinder 124 for closing the vanes in the sand hoppers 120 and 120a.

The valve 317 is now opened to admit air through the conduit 417 to the rearward end of both the cylinders 106 and 106a. This lowers the tamper heads 100 and 100a until the blocks 111 rest securely upon the sand deposited in the flasks 6 and 4. When the tamper heads 100 and 100a have been lowered, the valve 318 is opened to admit air through the conduit 418 to the regulator 500. The regulator 500 admits the air to the rearward end of the cylinders 62 and 62a in a number of short, rapid bursts. This effects the jolting of the sand in the flasks 6 and 4. The operation continues for several seconds and then the valve 318 is closed.

As soon as the valve 318 has been closed the valve 317 is closed, and the valve 317a is opened to admit air through the conduit 417a to the forward end of both the cylinders 106 and 106a. This raises the tamper heads 100 and 100a. As soon as the tamper heads 100 and 100a are partially raised, the valve 313 is closed and the valve 313a opened to admit air through the conduit 413a to the forward end of the cylinder 83. This withdraws the secondary strike offs 73 and 73a from above the flasks 6 and 4.

As soon as the secondary strike offs 73 and 73a have completed their withdrawal, the valve 312 is closed and the valve 312a opened to admit air through the conduit 412a to the rearward end of the cylinder 56. This raises the flasks 6 and 4 from the pattern plates 60 and 60a. The valve 311 is now opened to admit air by means of the conduit 411 to the forward end of the cylinder 36. This moves the carriages 16 and 16a forwardly, moving the drag flask 4 onto the rails 140 and the cope flask 6 onto the angles 182 of the flask hoist 170, and at the same time placing an empty cope flask and an empty drag flask on the molding stations 2 and 1, respectively. Simultaneously the valve 310 is opened to admit air through the conduit 410 to the forward end of the cylinder 130. This withdraws the rods 126 and 126a from the sand hoppers 120 and 120a. The valve 312 is next opened to admit air through the conduit 412 to the forward end of the cylinder 56. This lowers the track sections 53 and 53a and disengages the flasks 6 and 4 from the carriages 16 and 16a. The valve 311 is closed and the valve 311a is opened to admit air through the conduit 411a to the rearward end of the cylinder 36. This withdraws the carriages 16 and 16a to their starting position.

While the carriages 16 and 16a are returning to their rearward position, the valves 320 and 319 are opened for admitting air through the conduits 420 and 419 to the rearward end of the cylinder 176 and the rearward end of the cylinder 153, respectively. The downward actuation of the cylinder 176 deposits the cope mold 6 on a drag flask on the conveyor 3. The actuation of the cylinder 153 pivots the turnover frame 144 to a position to receive the drag flask 4. The valve 321 is now actuated for admitting air through the conduit 421 to the forward end of the cylinder 147. This causes the turnover frame 144 to clasp the drag flask 4. The valve 320 is closed and the valve 320a opened for admitting air through the conduit 420a to the forward end of the cylinder 176. This actuation of the cylinder 176 raises the cope flask hoist ready to receive another flask. The valve 322 is now opened admitting air through the conduit 422 to the rearward end of the cylinder 164. This forces the rods 160 forward one step. The valve 322 is now closed and the valve 322a opened to admit air through the conduit 422a to the forward end of the cylinder 164 for withdrawing the rods 160 to their normal position. While the rods 160 are returning, the valve 319 is closed and the valve 319a is opened to admit air by means of the conduit 419a to the forward end of the cylinder 153. This pivots the turnover frame 144 to deposit the drag flask 4 on the conveyor 3. As soon as the drag flask 4 has been deposited on the conveyor 3, the valve 321 is closed and the valve 321a is opened to admit air through the conduit 421a to the rearward end of the cylinder 147. This causes the turnover frame 144 to release the flask 4.

Also while the carriages 16 and 16a are returning to their rearward positions, the valve 310 is closed and the valve 310a is opened to admit air through the conduit 410a to the rearward end of the cylinder 130. This forces the rods 126 and 126a back through the hoppers 120 and 120a.

It will be understood that some of the separate steps described can be timed to be carried out simultaneously. This overlapping of steps which do not conflict with each other is substantially essential since the entire cycle which I have described can be completed by my machine in from 20 to 45 seconds, depending upon the desired rate of production. The exact length of the cycle will depend upon the speed of the motor 306. Preferably this motor 306 is of the variable speed type whereby the cycle length may be changed as desired.

I have described a machine capable of carrying out a complete mold making cycle. This machine simultaneously places a cope flask and a drag flask into a cope mold making station and a drag mold making station. These flasks are simultaneously seated upon their respective pattern plates and a pair of strike offs is placed over each of these flasks. Liquid parting is applied to the pattern plates as the strike offs move into position. Sand is then simultaneously released from a substantial height into each of these flasks and this sand is immediately initially struck off. Tamping heads are then lowered upon the sand and the flask and pattern plate joggled from beneath against the tamping heads. The tamping heads are then removed and another strike off actuated to level the sand with the top of the flask. The cope flask and drag flask are then removed from the mold making stations and simultaneously empty flasks are placed in the stations to replace them. The subcycle of making a mold consisting of placing the strike offs, dropping the sand, and tamping the sand may then be immediately repeated. While this cycle is being repeated, the drag flask is inverted and placed upon a conveyor. By means of this conveyor it is transported to a point where it is mated with a cope flask, and the resulting mold is removed from the machine automatically ready for pouring. Thus, it is seen that my machine involves not only a rapid, complete and automatic cycle but it also involves a subcycle for making the molds. By designing a machine in which the over-all cycle of making a complete mold is divided into at least two subcycles consisting (1) of the preparing of the individual mold halves and (2) of inverting one of the mold halves and mating them together to form the completed mold, which subcycles may each be carried on simultaneously, I have provided an entirely automatic machine capable of exceedingly rapid operation. By this telescoping of the operating cycles and by complete automatic coordination of the mold making operations at both the cope mold making station and the drag mold making station, I am able to provide an automatic mold making machine which is compact and, despite the large number of separate steps carried out by the machine, is relatively simple.

It is recognized that many modifications of my machine may be made, each of which will not affect the principle of my invention. Each of these modifications is to be considered as included in the hereinafter appended claims unless these claims by their language expressly provide otherwise.

I claim:

1. In an automatic mold making machine, the combination comprising: a step by step powered mold conveyor; a drag flask conveyor connecting with and terminating at said mold conveyor; means for moving flasks, step by step, along said drag flask conveyor toward said mold conveyor; a drag mold making station; said drag flask conveyor extending through said drag mold making station; a vertically reciprocable pattern plate within said drag flask conveyor at said drag mold making station; a cope flask conveyor connecting with and terminating at said mold conveyor; a cope mold making station; said cope flask conveyor extending through said cope mold making station; a vertically reciprocable pattern plate within said cope flask conveyor at said cope mold making station; a pair of primary strike offs, one at said drag mold making station and one at said cope mold making station; means for simultaneously aligning each of said primary strike offs with one of said pattern plates and for displacing them to one side of said pattern plates; a pair of secondary strike offs, one at said drag mold making station and one at said cope mold making station; means for simultaneously aligning each of said secondary strike offs with one of said pattern plates and for displacing them to one side of each of said pattern plates; a pair of tamper heads, one at said drag mold making station and one at said cope mold making station; means for simultaneously aligning each of said tamper heads with one of said pattern plates and for displacing each of said tamper heads to one side of each of said pattern plates; a pair of stationary sand hoppers, each vertically aligned with and spaced a substantial distance above one of said pattern plates; means for effecting the simultaneous release of sand from each of said sand hoppers while said tamper heads are displaced to one side of said pattern plates; a turnover frame adjacent said drag mold making station; means on said turnover frame for clasping a drag flask; means adjacent said cope mold making station for placing a cope mold on a drag mold while said drag mold is seated on said mold conveyor; means including a timing mechanism operatively connected to each of said elements of said mold making machine for coordinating the movement of each of said elements of said mold making machine.

2. In an automatic mold making machine, the combination comprising: a drag mold making station; a cope mold making station; a frame common to both of said stations; a pair of strike off frames mounted on said frame for horizontal reciprocating movement, one of said strike off frames at each of said mold making stations; a pair of tamper heads mounted on said frame for horizontal reciprocating movement, one of said tamper heads at each of said mold making stations; vertically reciprocable means at each of said mold making stations for supporting a pattern plate; a stationary sand hopper spaced a substantial distance above each of said pattern plates; means for releasing sand from each of said sand hoppers; a mold conveyor; a pair of flask conveyors; one of said flask conveyors passing through each of said mold making stations; each of said flask conveyors connecting with and terminating at said mold conveyor; a drag flask inverter frame, said inverter frame in one position being seated over the one of said conveyors passing through said drag mold making station and in another position seated over said mold conveyor; hoist means adjacent said cope mold making station and disposed over said mold conveyor for placing cope flasks on said mold conveyor; means for alternately, vertically aligning each of said strike offs with one of said vertically reciprocable means and displacing them to one side of said vertically reciprocable means; means for alternately vertically aligning each of said tamper heads with one of said vertically reciprocable means and displacing them to one side of said means; means for operating the said sand release means for each of said sand hoppers; means for reciprocating said turnover frame between said flask conveyor passing through said drag mold making station and said mold conveyor; means for operating said hoist; and a timer for coordinating the operation of each of the aforesaid elements.

3. In an automatic mold making machine, the combination comprising: a drag mold making station; a cope mold making station; a frame common to both of said stations; a pair of strike off frames mounted on said frame for horizontal reciprocating movement, one of said strike off frames at each of said mold making stations; a pair of tamper heads mounted on said frame for horizontal reciprocating movement, one of said tamper heads at each of said mold making stations; vertically reciprocable means at each of said mold making stations for supporting a pattern plate; a stationary sand hopper spaced a substantial distance above each of said pattern plates; means for releasing sand from each of said sand hoppers; a mold conveyor, said mold conveyor having a track assembly and means movable therealong for intermittently, unidirectionally moving molds; a pair of flask conveyors each of said conveyors having a track assembly and means movable therealong for intermittently, unidirectionally moving flasks; one of said flask conveyors passing through each of said mold making stations; each of said flask conveyors connecting with and terminating at said mold conveyor; a drag flask inverter frame, said inverter frame in one position being seated over the one of said conveyors passing through said drag mold making station and in another position seated over said mold conveyor; hoist means adjacent said cope mold making station and disposed over said mold conveyor for placing cope flasks on said mold conveyor; means for alternately, vertically aligning each of said strike offs with one of said vertically reciprocable means and displacing them to one side of said vertically reciprocable means; means for alternately vertically aligning each of said tamper heads with one of said vertically reciprocable means and displacing them to one side of said means; means for operating the said sand release means for each of said sand hoppers; means for reciprocating said turnover frame between said flask conveyor passing through said drag mold making station and said mold conveyor; means for operating said hoist; and a timer for coordinating the operation of each of the aforesaid elements.

References Cited in the file of this patent

UNITED STATES PATENTS

| Number | Name | Date |
|---|---|---|
| 1,512,721 | Sutton | Oct. 21, 1924 |
| 2,325,501 | Gedris | July 27, 1943 |